W. W. and C. C. Wright,
Mower
No. 9458
Patented Dec. 7, 1852.
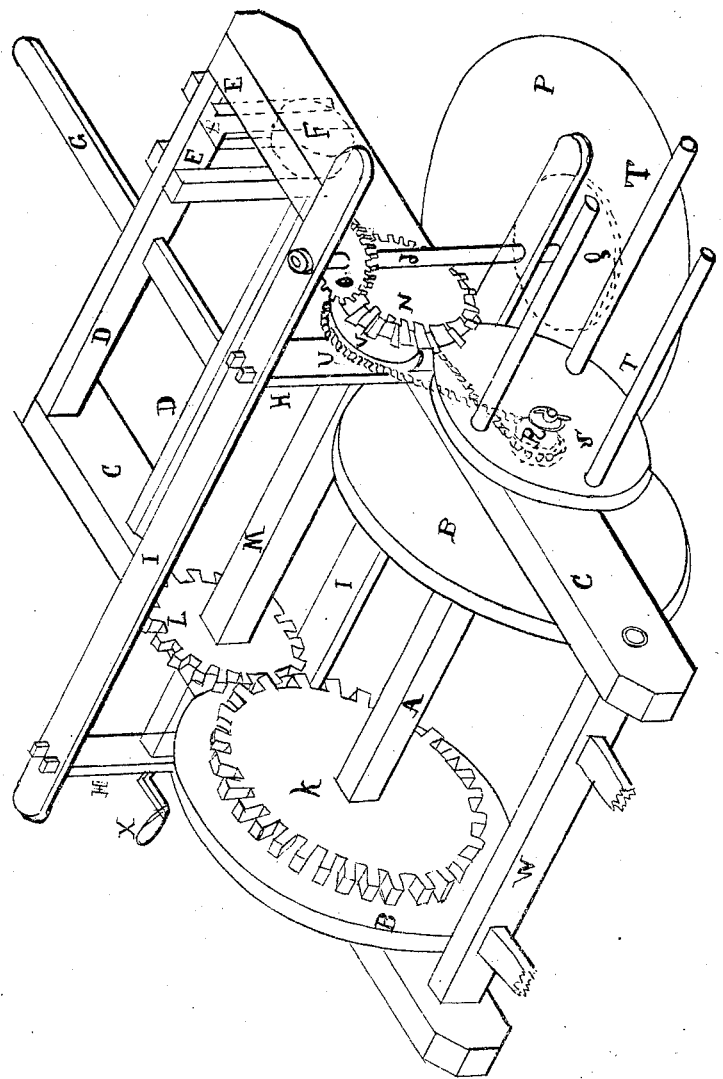

UNITED STATES PATENT OFFICE.

W. W. WRIGHT AND C. C. WRIGHT, OF CANTON, PENNSYLVANIA.

IMPROVEMENT IN REELS FOR HARVESTERS.

Specification forming part of Letters Patent No. 9,458, dated December 7, 1852.

*To all whom it may concern:*

Be it known that we, WARREN W. WRIGHT and CLARK C. WRIGHT, of Canton, in the county of Bradford and State of Pennsylvania, have invented certain new and useful Improvements in Mowing-Machines for Mowing Grass, Grain, &c.; and we do hereby declare that the same are described and represented in the following specification and accompanying drawing.

The nature of our invention consists in a circular rotating scythe with a reel or series of revolving arms, which arms are arranged and made to revolve, so as to strike the tops of the grass or grain and sweep them toward and over the circular scythe, so that the scythe will cut the stalks with more certainty and allow the machine to do a far greater amount of work in a given time, and in arranging a circular convex projection under the scythe, so as to prevent it from getting too near the ground; also, in arranging a wheel under the rear corner of the carriage, on the side next to the scythe, which serves for a fulcrum to tip the frame and raise the scythe to pass stones, stumps, or other obstructions.

To enable others skilled in the art to make and use our improvements, we will proceed to describe their construction and the manner of using the same, referring to the drawing before mentioned.

A is an axle, which has two wheels, B B, fastened to it, which run upon the ground and support the carriage, constructed of two parallel bars, C C, with holes in them fitted to the pivots of the axle A. The bars C C are connected together by the cross-bars D D, all of which bars are firmly fastened together, as represented. There are two pieces, E E, fastened to the hindmost cross-bar, with holes in them fitted to the pivots of the wheel F. (Represented in dotted lines.) The wheel F supports the back end of the carriage and serves for a fulcrum to tip the carriage upon by bearing down the lever G, fastened into the cross-bars D D, and raise the scythe, to be hereinafter described, so as to pass stones, stumps, or other obstructions. There are two posts, H H, fastened to the bars C C, which posts have the rails I I fastened to them, and the ends of these rails extend over or beyond the frame to form the bearings or boxes for the shaft J to turn in. The gear K is fastened to the axle A and turns the wheel L upon the shaft M, which shaft turns in holes fitted for it in the posts H, and has the gear N fastened to it, which turns the gear O upon the shaft J to turn the circular scythe P, fastened to the lower end of the shaft J by the broad convex head Q, (represented in dotted lines,) which head Q is under the scythe and prevents it from coming in contact with the ground. The end of the axle A projects beyond the frame and forms the pivot for the pulley R (represented in dotted lines) and disk S to turn upon, which disk has a number of pins or arms, T T, inserted in it. These arms strike the tops of the grass or grain and sweep them over the scythe, when they are made to revolve by the band U upon the pulleys R and V, the pulley V being fastened to the shaft M for that purpose. There are holes in the fore ends of the bars C for the pivots of the bar W, to which the pole or shafts are fastened, so as to attach the animal or animals by some convenient fixtures to draw the machine and turn the wheels B and operate the whole machine. In moving the machine from place to place the gear L upon the shaft M may be moved and slipped out of gear, so as not to turn the scythe until the machine arrives at the place where it is to work, when it may be set in gear again, and the gear L may be slipped out of gear and the crank X applied to the shaft M to turn the scythe to sharpen it, a stone, emery-stick, or some similar thing being held against it for that purpose.

We contemplate that spurs may be set in the peripheries of the wheels B to prevent them from slipping upon the ground and insure them to turn and operate the scythe, &c.

The machine having been constructed as above described and the team attached to it, it is drawn along so as to bring the circular scythe in contact with the grass or grain, which is swept over it by the arms T of the reel, and as it is cut it falls upon the scythe and is carried round and falls off of the scythe upon the ground.

What we claim as our invention, and desire to secure by Letters Patent, is—

Extending the axle of the driving-wheels so far beyond the carriage as may be necessary to form a pivot for the reel to turn upon and allow of its rotation by a band, as described, independent of the rotation of the axle, substantially as set forth.

In testimony whereof we have hereunto signed our names before two subscribing witnesses.

WARREN W. WRIGHT.
CLARK C. WRIGHT.

Witnesses:
WM. W. WRIGHT,
LORENZO D. WRIGHT,
G. W. GRIFFIN.